(12) United States Patent
Harris

(10) Patent No.: US 11,726,520 B2
(45) Date of Patent: Aug. 15, 2023

(54) MODULAR INPUT INTERFACE DEVICE WITH MULTI-AXIAL INTERACTION

(71) Applicant: Harman International Industries, Incorporated, Stamford, CT (US)

(72) Inventor: Daren Harris, Gilbert, AZ (US)

(73) Assignee: Harman International Industries, Incorporated, Stamford, CT (US)

( * ) Notice: Subject to any disclaimer, the term of this patent is extended or adjusted under 35 U.S.C. 154(b) by 59 days.

(21) Appl. No.: 17/311,958

(22) PCT Filed: Oct. 3, 2019

(86) PCT No.: PCT/US2019/054409
§ 371 (c)(1),
(2) Date: Jun. 8, 2021

(87) PCT Pub. No.: WO2020/142120
PCT Pub. Date: Jul. 9, 2020

(65) Prior Publication Data
US 2022/0026944 A1    Jan. 27, 2022

(30) Foreign Application Priority Data

Jan. 4, 2019  (WO) ................. PCT/US2019/012411

(51) Int. Cl.
| | | |
|---|---|---|
| G05G 9/047 | (2006.01) |
| G06F 3/0338 | (2013.01) |
| G05G 1/08 | (2006.01) |
| G06F 3/0362 | (2013.01) |

(52) U.S. Cl.
CPC .......... *G05G 9/047* (2013.01); *G05G 9/04792* (2013.01); *G05G 9/04796* (2013.01); *G06F 3/0338* (2013.01); *G06F 3/0362* (2013.01); G05G 1/08 (2013.01); G05G 2009/0474 (2013.01); G05G 2009/04777 (2013.01); G05G 2009/04781 (2013.01)

(58) Field of Classification Search
CPC ...... G05G 1/08; G05G 9/047; G05G 9/04792; G05G 9/04796; G05G 2009/0474; G05G 2009/04777; G05G 2009/04781; G06F 3/0338; G06F 3/0362
See application file for complete search history.

(56) References Cited

U.S. PATENT DOCUMENTS

| | | | | |
|---|---|---|---|---|
| 6,078,247 A * | 6/2000 | Shimomura | ........... | H01C 10/16 338/160 |
| 6,353,430 B2 * | 3/2002 | Cheng | .................... | G05G 9/047 345/161 |
| 6,989,497 B1 * | 1/2006 | Lee | ......................... | G05G 9/047 200/6 A |
| 9,122,298 B2 * | 9/2015 | Kern | ......................... | G05G 5/03 |

(Continued)

FOREIGN PATENT DOCUMENTS

| | | |
|---|---|---|
| EP | 1750195 A1 | 2/2007 |
| WO | 02061523 A1 | 8/2002 |
| WO | WO-2019136297 A1 * | 7/2019 |

*Primary Examiner* — Adam D Rogers
(74) *Attorney, Agent, or Firm* — Angela M. Brunetti

(57) ABSTRACT

A modular input interface device having multi-axial functionality in a housing having an input interface that is capable of up to seven directions of movement. The modular interface device provides input to at least one processor associated with one or more vehicle systems.

15 Claims, 8 Drawing Sheets

(56) References Cited

U.S. PATENT DOCUMENTS

| | | |
|---|---|---|
| 2003/0019316 A1 | 1/2003 | Pelco |
| 2006/0110086 A1 | 5/2006 | Morita et al. |
| 2010/0035195 A1 | 2/2010 | Querejeta et al. |
| 2013/0277133 A1 | 10/2013 | Matsuda |
| 2018/0238465 A1 | 8/2018 | Ha |

* cited by examiner

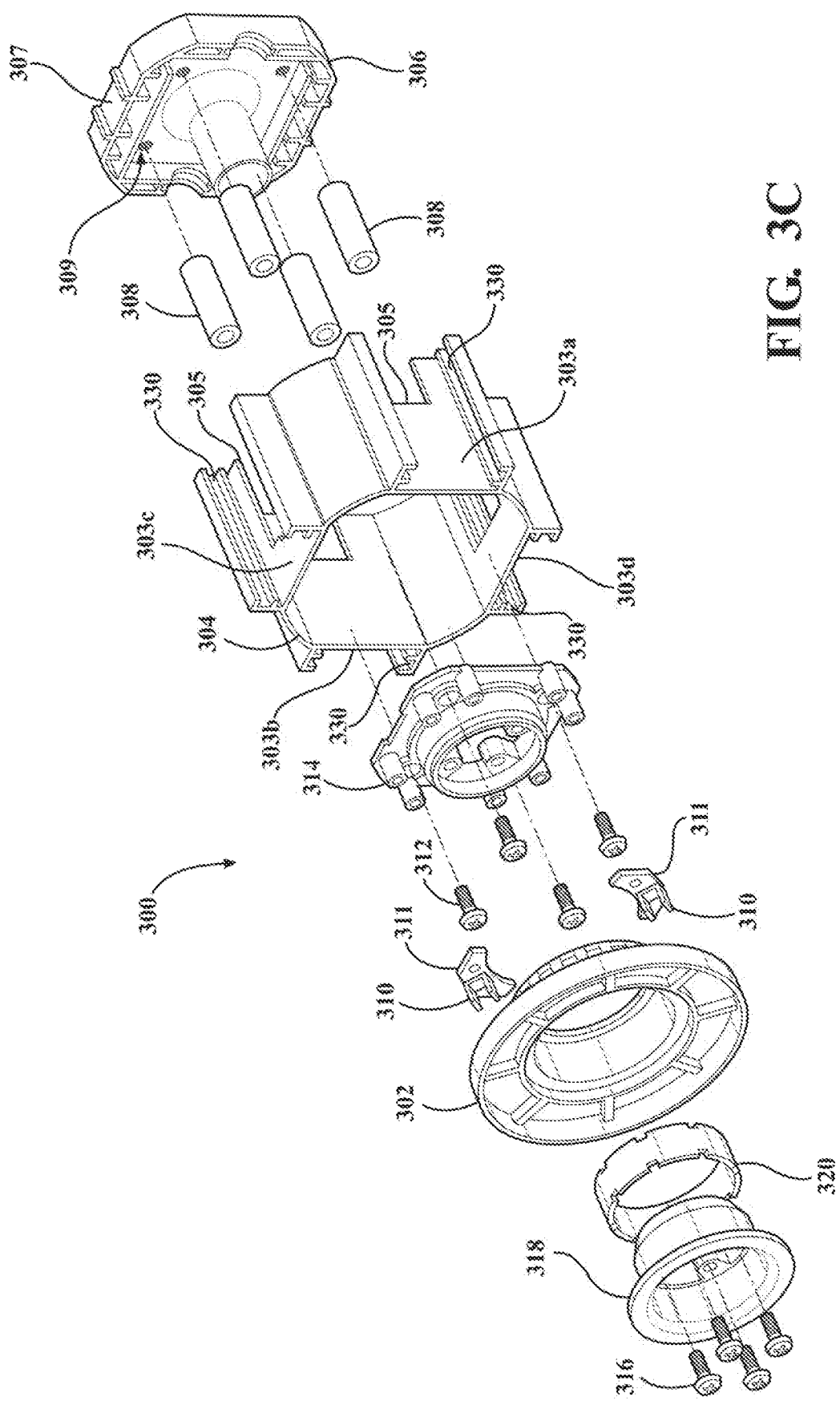

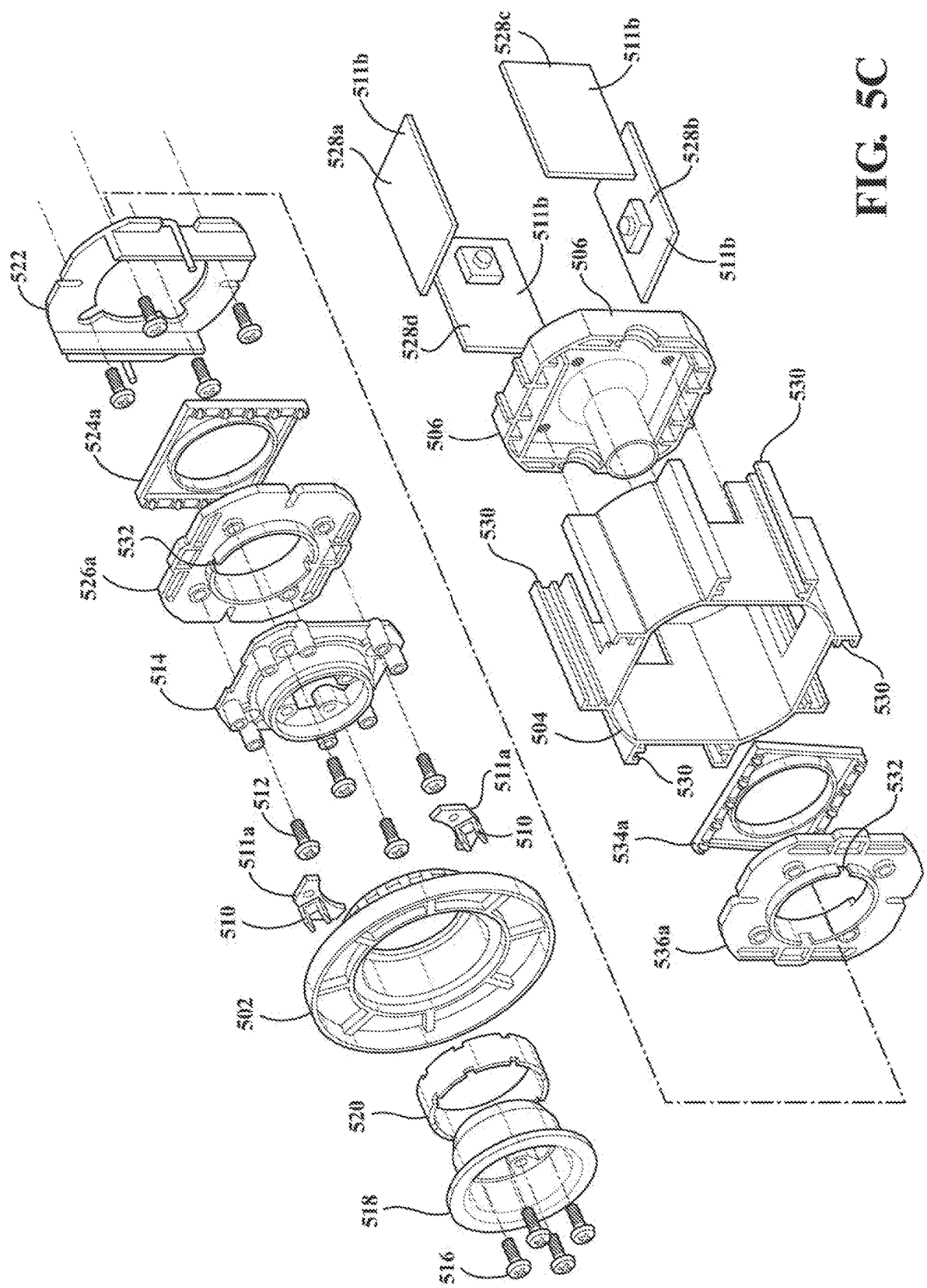

MODULAR INPUT INTERFACE DEVICE WITH MULTI-AXIAL INTERACTION

CROSS-REFERENCE TO RELATED APPLICATIONS

This application is a 371 of PCT patent application PCT/US19/054409 filed Oct. 3, 2019 titled Modular Input Interface Device with Multi-Axial Interaction, which is a Continuation in part of and claims priority to PCT patent application PCT/US19/012411 filed Jan. 4, 2019 titled Input Interface with Multi-Axial Interaction.

TECHNICAL FIELD

The inventive subject matter is directed to a user input interface device.

BACKGROUND

As surfaces and screens inside a vehicle become digitized, it becomes important to define ideal interaction modalities to interact with the surfaces and screens in such a manner so as to keep them simple and intuitive, particularly for a driver of a vehicle that is attempting to perform tasks within a vehicle while operating the vehicle. For example, adjusting the radio, climate control, etc. A "rotary first" approach ensures all primary tasks may be completed while a driver's hands remain on the steering wheel and minimizes cursor-based interaction to navigate a menu structure and active areas of the display. The modalities for interacting with the surfaces and screens are varied in such a degree that a version of an input interface that a driver uses for interaction may be customized for a specific environment to optimize a user experience. However, the complexity and cost to design, manufacture and implement many different versions of an input interface may be prohibitive to an ideal user experience.

SUMMARY

In one or more embodiments, a modular input interface device provides user interaction and allows for variable degrees of multi-axial functionality combining rotary, push, and slide functions into an interface housing.

In one or more embodiments, a modular input interface device may be modified to implement varying directions of movement of the input interface device. The modular input interface device has a housing having a modular configuration that is capable of sensing movement of a user input mechanism in up to seven directions. In one or more embodiments a modular input interface device communicates with one or more systems, such as displays, and may also have structure to hold the display or the content being displayed fixed in place while rotational and other movement of the input interface device takes place.

DESCRIPTION OF DRAWINGS

FIG. 3C is an exploded view of the modular input interface device of FIG. 3A;

FIG. 5C is an exploded view of the device shown in FIG. 5A.

Figure 1A:
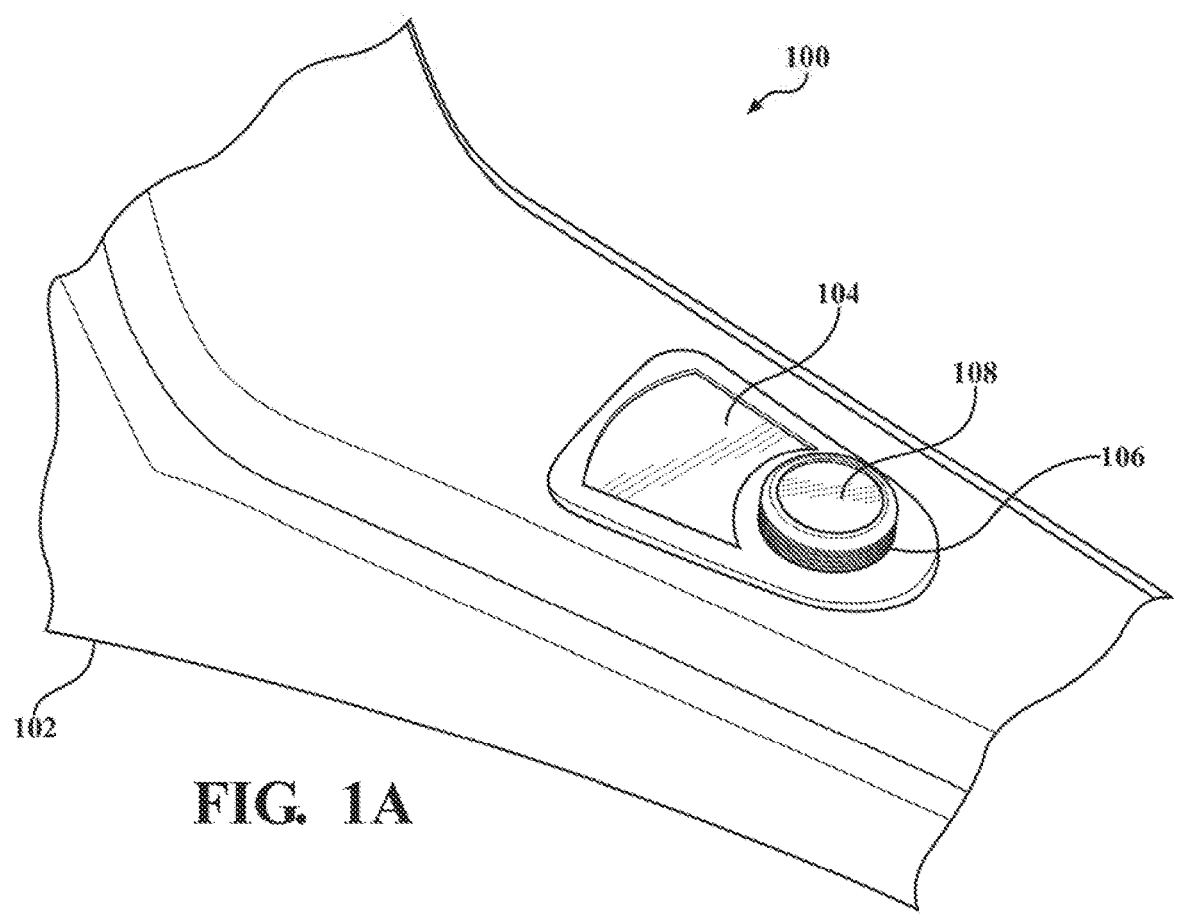
FIG. 1A is a partial perspective view of a modular input interface device in a vehicle environment.

Elements and steps in the figures are illustrated for simplicity and clarity and have not necessarily been rendered according to any particular order or sequence. For example, elements are shown positioned in a particular arrangement to help to improve understanding of embodiments of the inventive subject matter.

DETAILED DESCRIPTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Any one or more of servers, receivers, or devices described herein that the inventive subject matter is described to interact includes computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc.. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

The example application of the inventive subject matter described herein is directed to an interior cabin of an automotive vehicle having an instrument panel, or console, with which users may interact. The instrument panel may include a plurality of display screens accessible to the users for controlling various vehicle systems such as an infotainment system, an audio system, an instrument cluster, a climate control system, and other vehicle systems such as seats, doors, windows, trunk, vehicle states related to drive systems such as four-wheel drive mode and cruise control to name some examples. The user interacts with various vehicle systems in order to power on-off and adjust the various vehicle systems. This is an example and the inventive subject matter may be implemented in environments other than the interior of an automotive vehicle.

The vehicle may include one or more sensors inside and outside of the vehicle for monitoring the vehicle, the users and/or the environment. For example, one or more pressure sensors, microphones, accelerometers, and cameras. Further, the vehicle may include a communication link, or other sensor, for detecting and connecting to a mobile device such as a cellular phone, a tablet, a computer, a portable media player or other mobile computing device including small wearable devices. The communication link may be wired by way of, for example, a Universal Serial Bus (USB), a Mobile High-Definition Link (MHL), a High-Definition Multi-media interface (HDMI), and Ethernet. The communication link may be wireless, for example, Bluetooth, WiFi, WiFi Direct Near-Field Communication, cellular connectivity, etc. and configured to provide two-way communication between the mobile device and the in-vehicle computing system.

One or more applications may be operable on a mobile device or on an in-vehicle system for providing content to a display within the vehicle. For example music playlists, contacts, calendars, location information, weather information, GPS or navigation route information, a user profile that may include preferences such as climate settings, seat settings, music volume settings, display configuration settings, other vehicle settings such as steering wheel controls, cruise control, headlight controls, pedal settings, etc. for various vehicle systems.

A user interacts with one or more systems displays, or applications by way of a modular input interface device. In one or more embodiments, the modular input interface device is subjected to user interaction and allows for multi-axial functionality in multiple ways combining rotary, push, and lateral movement functions into a single interface. The modular input interface device may have an output screen integral to the device that provides visual feedback of the user interaction with the interface. The modular input interface may, alternatively or additionally, be in communication with one or more display screens separate from the modular input interface device.

Figure 1B:
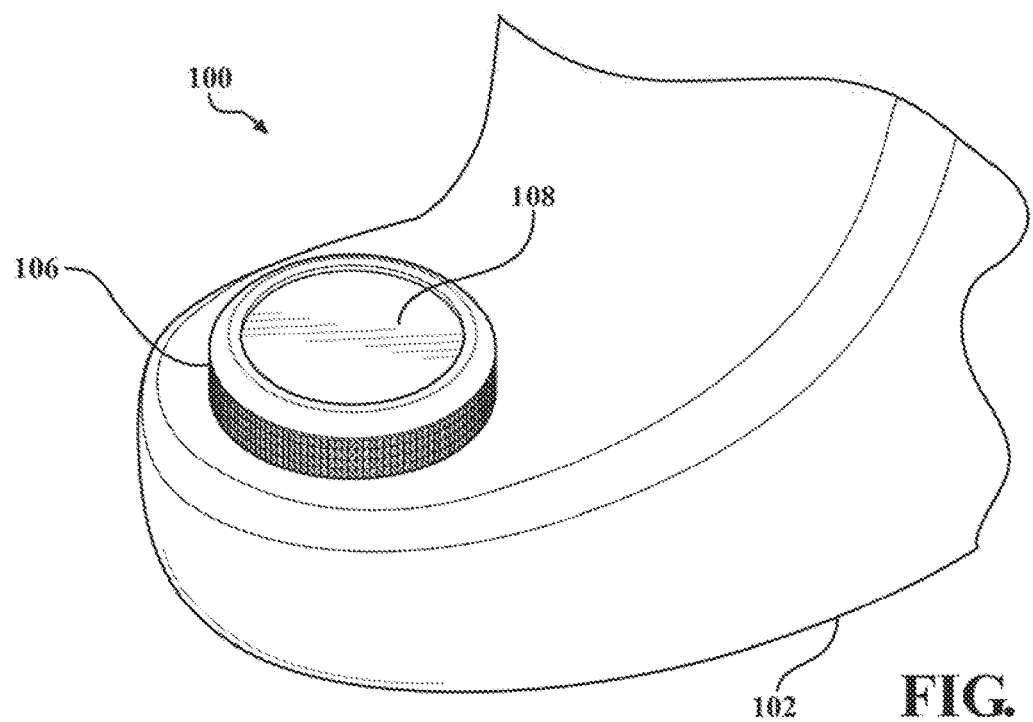
FIG. 1B is a partial perspective view of a modular input interface device in a vehicle environment.

The modular input interface device may be positioned within a vehicle as shown in FIGS. 1A and 1B. For example, the modular input interface device may be positioned on a console, a dashboard, or instrument panel, of the vehicle. In the dashboard, the modular input interface device may be positioned in the center stack. The modular input interface device may be connected to one or more additional display and/or one or more additional systems. For example, modular input interface device may be connected to a navigation system. The navigation system may include a display for navigational content, such as outputting a navigational route. The display on the input interface device may replicate the navigational content either in whole or in part, such as a compass heading.

The modular input interface device may be positioned in a mid-center location of the vehicle. The modular input interface device may be positioned on a seat of the vehicle or adjacent to a seat of the vehicle. The modular input interface device may be positioned elsewhere in the vehicle, such as in a roof of the vehicle.

The modular input interface device may be designed to blend in with a trim element of the vehicle. This may include adjusting the color of the modular input interface device and/or emitted pattern of the modular input interface device to match that of the trim element. The trim element may surround the modular input interface device or may be laid over the input interface device. For example, the modular input interface device may raise up from a rest position to an active position. In the rest position, the display may be flush with the trim element. The display, via the processor, may adjust the content to match the surrounding trim element, such as for color, pattern, etc. Alternatively, the modular input interface device may have a material laid over the display. The material may be the same as for the trim element. At rest, the material will therefore match the trim element. When active, though, the display may shine content through the display. The modular input interface device may therefore be designed to seamlessly flow with the trim of the vehicle, as least when at rest.

The modular input interface device may be connected to a camera of a vehicle, such as a rear back-up camera. An image from the camera may be projected through the display of the modular input interface device.

Features of the modular input interface with multi-axial functionality and output screen include, but are not limited to: multi-axial functionality from three, five or seven directions of movement, integration of output screen and multi-axial functionality on the input interface; output screen allows for contextual information and change in function using a single input interface; output screen in combination with multi-axis functionality to allow for at least seven distinct axis functionality; locking mechanisms for encoders; touch enable output screen; proximity detection for outer surface of input mechanism; visual cue of proximity detection upon approach; a variety of material for finish of output screen that allows for light to come through such as leather, wood or metal; video processing algorithm and dithering to create a visually appealing appearance; ambient illumination that may be personalized and/or altered; cameras on exterior of the vehicle may capture surroundings for display on output screen of input interface.

FIG. 1A and FIG. 1B show a partial view of a vehicle interior 100 having a console 102, or similar interior trim part and a modular input interface device 106 in communication with a display 104 (Shown in FIG. 1A only). The modular input interface device 106 is shown as a knob device that is able to move in a number of directions and is in communication with a controller (not shown) having a processor and a non-transitory computer-readable medium capable of storing and executing instructions (also not shown in FIGS. 1A and 1B).

As shown in FIGS. 1A and 1B, the modular input interface device 106 may also include a display 108 on a top surface or forming a top surface of the modular input interface device 106. In practice this display 108 may blend in with its surroundings, emit a pattern, color, etc. to blend in with its surroundings when the modular input interface device is at rest and become visible when active. The display 108 on the modular input interface device 106, when active, may replicate content being displayed on a separate display 104, such as navigational content either in whole or in part. The display 108 on the modular input interface device 106 may also display its own content, separate from or related to the content displayed on the separate display 104 of FIG. 1A.

The content that is being displayed on the modular input interface device display 108 may remain in a fixed orientation no matter what direction the modular input interface device 106 is moved by a user. For example, if a user rotates the modular input interface device 106, the content being displayed on the display 108 associated with the modular input interface device 106 remains in a fixed position. The movement of the modular input interface device 106 does not cause the content being displayed to move along with movement of the modular input interface device 106.

The modular input interface device 106 may rotated, be pushed, pulled, moved up (frontward), moved down (backward), moved left, and moved right by a user. In operation the modular input interface device may be pushed and returned vertically along an axis. The modular input interface device may slide front to back laterally along an axis. The modular input interface device may slide left and/or right laterally on an axis. The modular input interface device may also rotate about the axis with 360° of freedom in clockwise and counterclockwise directions. Movement by the user provides inputs desired by the user to cause adjustments to be made to various systems that are in communication with the modular input interface device 106. For example, the user's movement may provide inputs to one or more vehicle systems such as, but not limited to, a navigation unit, an entertainment unit, or a climate control system.

At rest, the display 108 and the modular input interface device 106 may be coaxially aligned on an axis. When the interface input device 106 is moved, a user would likely notice the display moving with the knob, creating a visual of the content being displayed on the interface input device display not being where it is expected to be. However, the display 108 is fixed in relation to the movable portion of the device. The display portion of the interface input may be fixed on an axis and the non-display portion of the interface input may rotate about and move off-axis without affecting an orientation of the content being displayed.

Figure 2A:
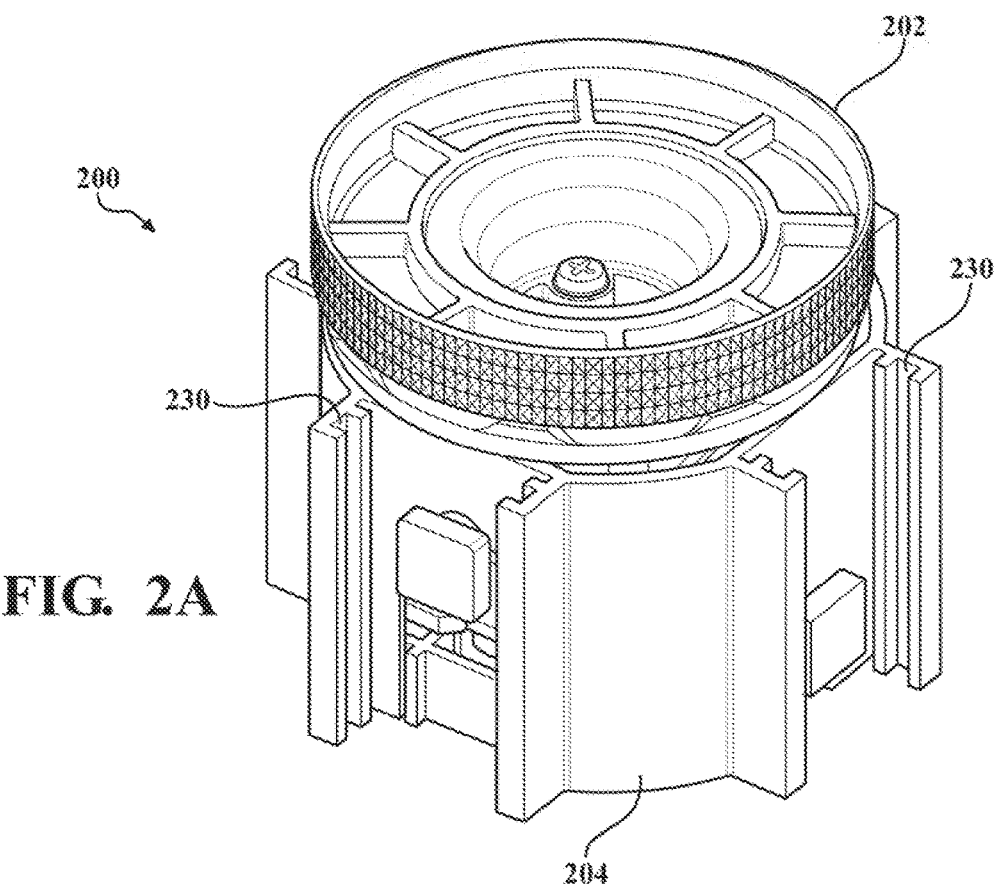
FIG. 2A is a perspective view of the modular input interface.
Figure 2B:
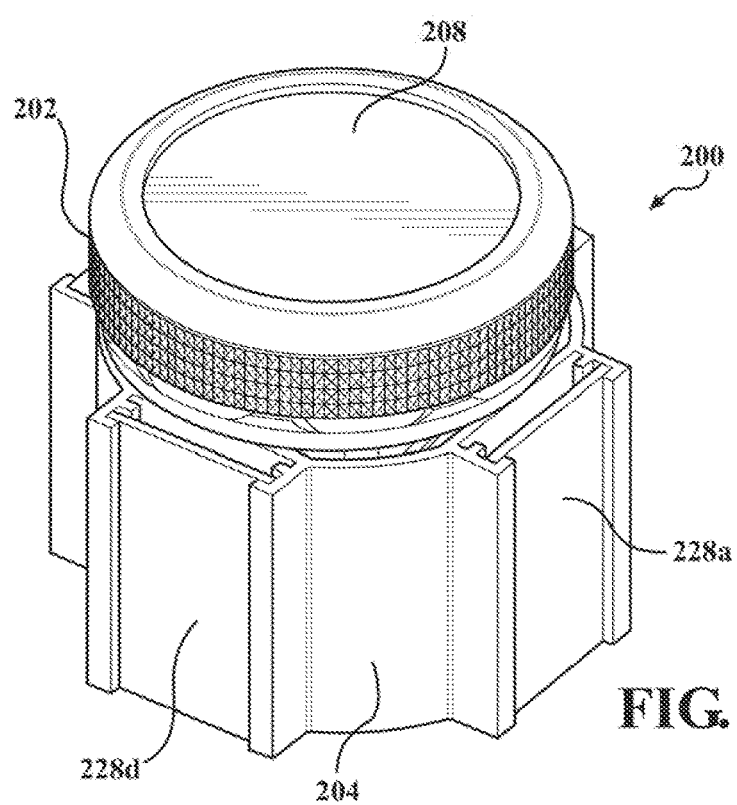
FIG. 2B is a perspective view of the modular input interface device having a display on a top surface and sensors in a housing for sensing lateral movement of the device.

FIG. 2A is a perspective view of the modular input interface device 200 having a housing 204 with slots 230 that are configured to receive sensors (not shown in FIG. 2A) for sensing lateral movement of an outer ring 202. FIG. 2B is a perspective view of the modular input interface device 200 with a display 208 on an upper surface of the outer ring 202. Only two sensors 228a and 228d are visible in the view shown in FIG. 2B. The modular input interface device 200 is modifiable so that it may accommodate movement of the outer ring in up to seven directions. In each modular configuration the outer ring 202 is attached to the housing and is free to rotate about the display 208. The housing 204 remains stationary and its dimensions remain unchanged regardless of the configuration (three, five or seven degrees of movement) of the modular input interface device 200.

In one or more embodiments the modular input interface device is configurable from three, to five, to seven directions of movement. In one or more of the embodiments the configuration of the rotatable outer ring 202 with a fixed base keeps the display in a fixed position with respect to any movement of the outer ring. The outer ring may be moved in three, five or seven directions yet contains cooperating structure to hold the display fixed in place while rotational and push-pull movement of the outer ring takes place. Because the display remains stationary, the content being displayed also remains stationary. The modular input interface device dictates the degree of allowable movement of the outer ring 202 and sensors associated with eh modular input interface device senses three, five and seven directions of movement of the outer ring. This may also be accomplished while keeping the display stationary.

Figure 3A:
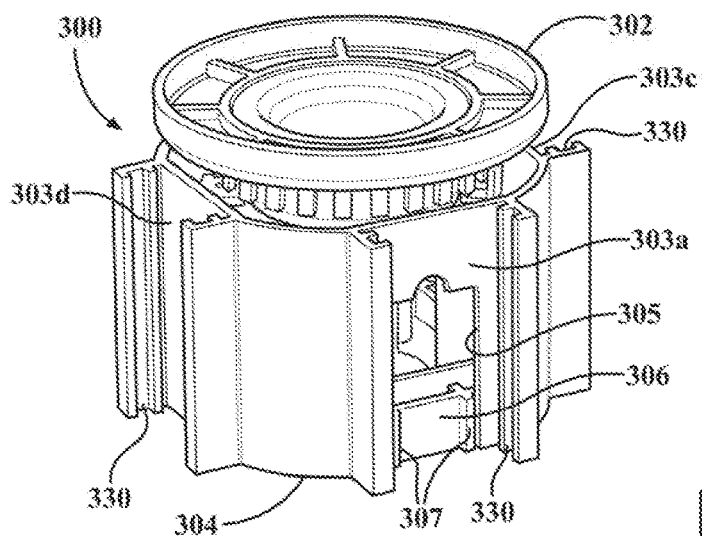
FIG. 3A is a perspective view of a modular input interface device having movement in three directions.
Figure 3B:
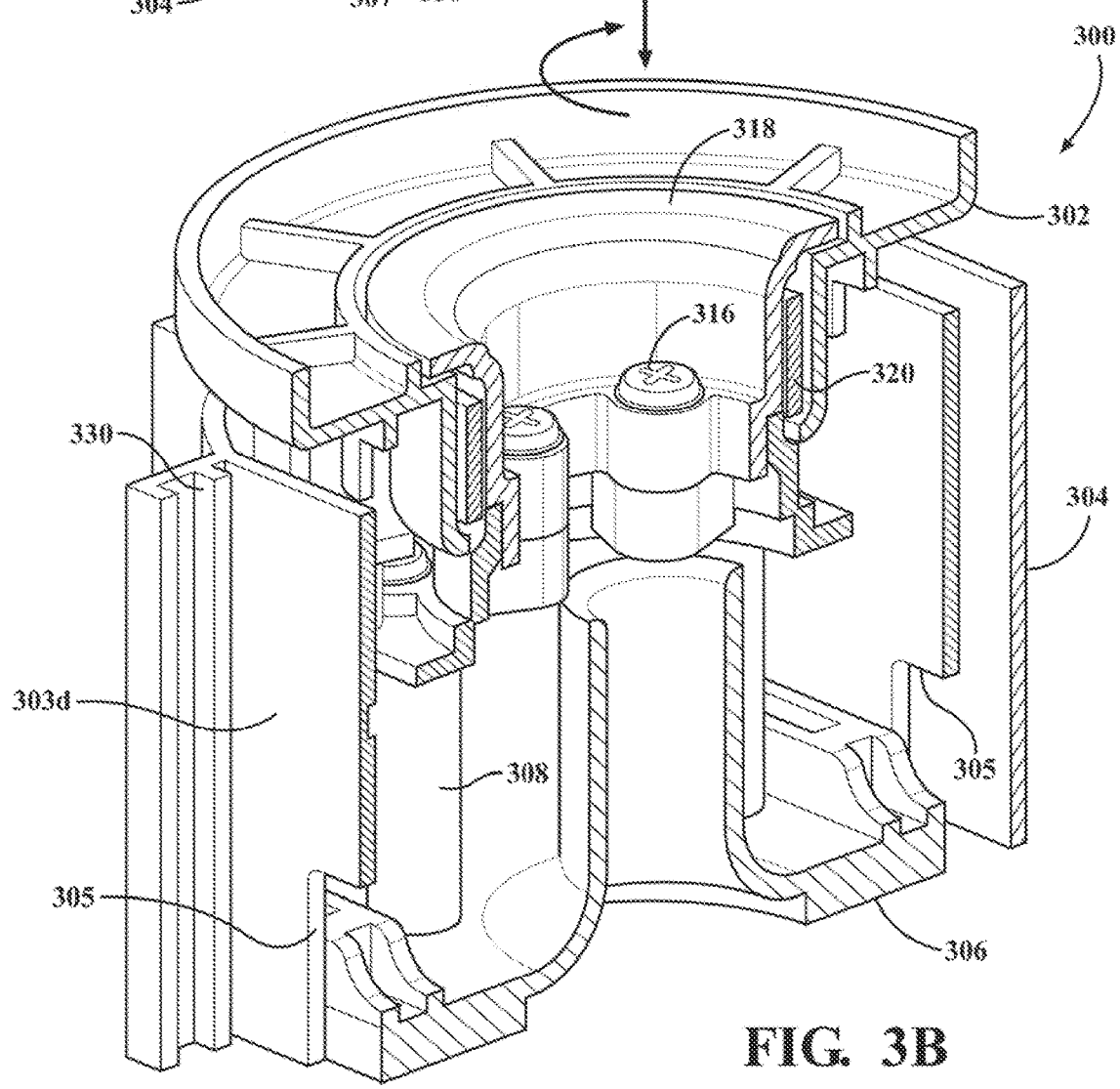
FIG. 3B is a cut-away view of the modular input interface device of FIG. 3A.

In FIGS. 3A, 3B and 3C a modular input interface device 300 having an outer ring 302 capable of three directions of movement is shown. Movement of the outer ring 302 occurs in association with a fixed housing 304. The outer ring 302 may rotate in a clockwise direction, rotate in a counterclockwise direction and be vertically pushed. In the example described herein the push motion has an automatic return, for example a spring return that cooperates with a tactile switch (not shown). In an example of the operation, the outer ring 302 may be rotated to a desired position and pushed to confirm a selection, which selection may be communicated as a user input to one or more systems associated with the user input interface device 300.

In a perspective view shown in FIG. 3A, the modular input interface device 300 has the outer ring 302 rotatably set within the housing 304. The housing 304 has four sides, or faces 303a, 303b (not shown in FIG. 3A), 303c and 303d. Each face 303a-303d has an opening 305 therein. A base 306 is positioned within the housing 304 at a bottom portion of the housing. An outer portion of the base 306 abuts the interior surface at the bottom portion of the housing 304. The base 306 may be retained within the housing as shown in FIG. 3A, with projections 307 on the base 306 that cooperate with the openings 305 of the housing 304 to retain the base 306 in the housing 304.

Each face 303a-303d of the housing 304 has a slot 330 on an exterior surface of the housing 304. The slots 330 are configured to receive sensors that cooperate with and sense movement of other elements inside the housing 304 of the modular input interface device 300. However, for the modular input interface device 300 configuration being shown in FIG. 3, which has three directions of movement, there is no need for sensors to be incorporated into the slots 330.

FIG. 3B is a cut-away view of one or more embodiments of the modular input interface device 300. The outer ring 302 is rotatably attached to a male inner housing 318 by way of a rotary bearing system 320. The male inner housing 318 is fixedly attached to a female inner base 314 that cooperates with the base 306. The male inner housing 318 and the female inner base 314 remain fixed within the housing 304 and with respect to any rotational movement of the outer ring 302. Also, the display (not shown) could be fixed to the male inner housing 318, so that the display is also not affected as the outer ring 302 is manipulated.

FIG. 3C is an exploded view of the modular input interface device 300. A sensor element 310, shown as a pair of sensors 310 in FIG. 3C, detect rotational movement of a portion of the outer ring 302 and communicate with a processor 311 provide information necessary for the processor 311 to generate and execute instructions associated with content being displayed and/or one or more settings for one or more vehicle systems. The sensors 310 shown in FIG. 3C are optical sensors. However, it should be noted that many other sensors may be used, such as paddle switches, Pcap sensors etc. Rotational movement and push movement of the outer ring 302 may cause an adjustment to the content being displayed at any one or more displays associated with the modular input interface device 300, the rotational and push movement of the outer ring 302 may communicate instructions to a processor (not shown) associated with one or more relevant vehicle systems that cause an adjustment to the vehicle system. The rotational and/or push movement of the outer ring 302 may cause an adjustment to any content being displayed and an adjustment to one or more settings of one or more vehicle systems. In the example shown in FIG. 3C, the sensors 310 are mounted to a printed circuit board having a processor 311 and are positioned in the housing 304 so that they receive, or interact with, a portion of the outer ring 302 in such a manner that they detect or sense rotational movement of the outer ring 302. Any rotational movement of the outer ring 302 that is detected by sensors 310 may be communicated to a processor on the printed circuit board 311 and/or communicated to one or more processors associated with any one or more vehicle systems to cause adjustments to content being displayed or to system settings.

Spacers 308 are used in the example shown in FIGS. 3B and 3C and provide support structure necessary to offset any distance between the female inner base 314 and the base 306. Fasteners 312 may attach the female inner base 314 to the spacers 308. The spacers 308 may rest on the outer base 306, for example on raised nodes or nodules 309 on a surface of the base 306. The spacers 308 keep the outer ring 302 at a predetermined height with respect to the housing 304 as needed to incorporate the modular input interface device 300 into the environment for which it is being applied.

The male inner housing 318 is positioned in a center opening of the outer ring 302, such as an inner diameter of the outer ring 302. The male inner housing 318 is fixed to the interior structure (such as the female inner base 314) of the housing 304 and remains stationary. The outer ring 302 is free to rotate about the male inner housing 318 through the rotary bearing system 320. In FIG. 3C, the rotary bearing 320 is shown in FIG. 3C as a cage positioned between the outer ring 302 and the male inner housing 318. The cage 320 allows the outer ring 302 to rotate about the male inner housing 318 while the male inner housing 318 is supported by and attached to the female inner base 314. Fasteners 316 may attach the male inner housing 318 to the female inner base 314.

In one or more embodiments, a switch (not shown) may be positioned at the base 306 for sensing push movement of the outer ring 302. The switch is not shown in FIG. 3C but could be a mat switch or other type of tactile switch to communicate push movement of the modular input interface device to one or more processors.

Figure 4A:
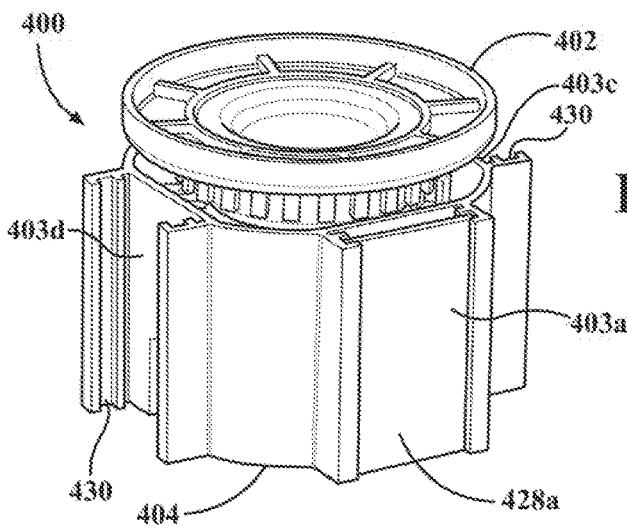
FIG. 4A is a perspective view of the modular input interface device having movement in five directions.
Figure 4B:
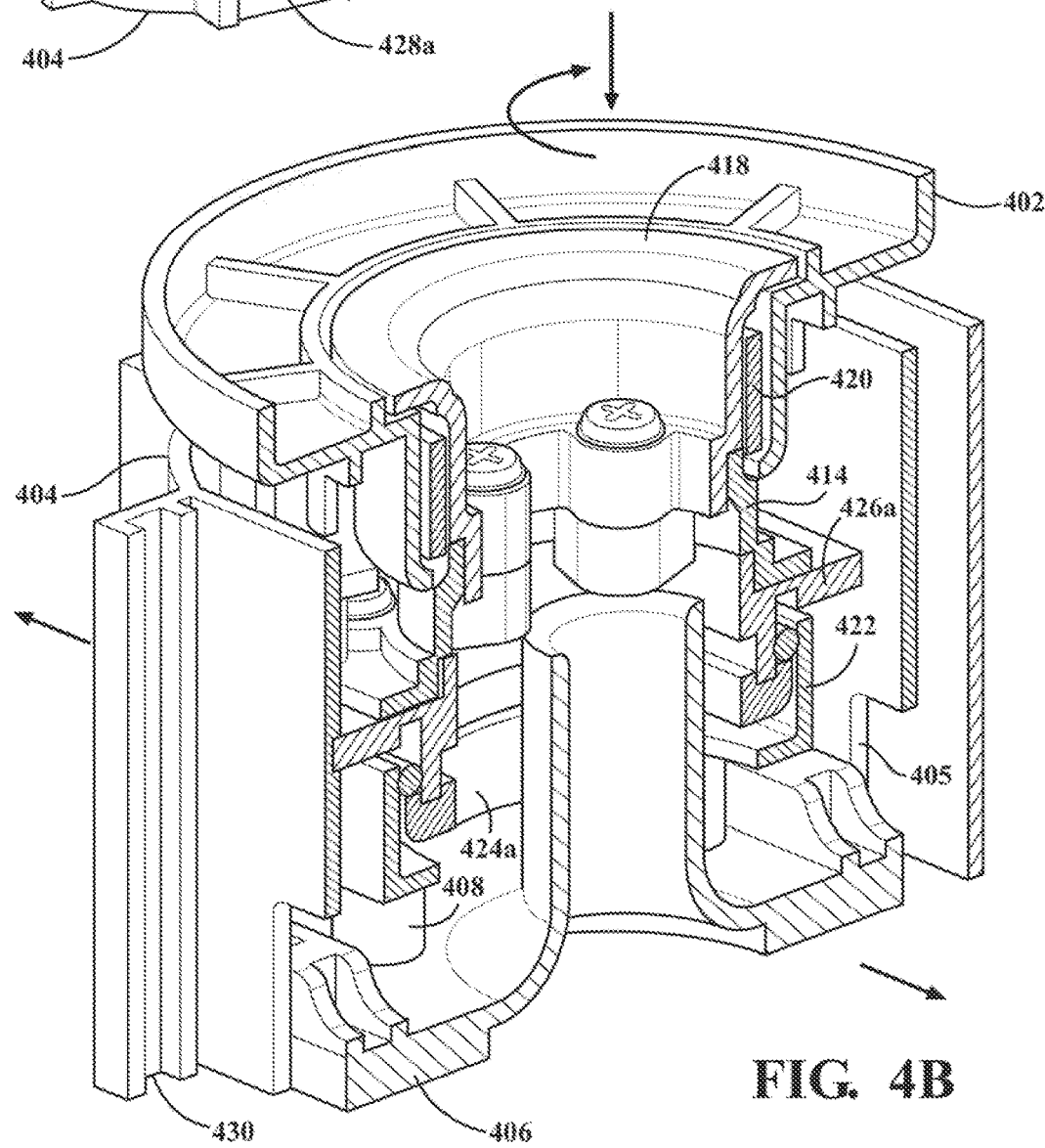
FIG. 4B is a cut-away view of the modular input interface device of FIG. 4A.
Figure 4C:
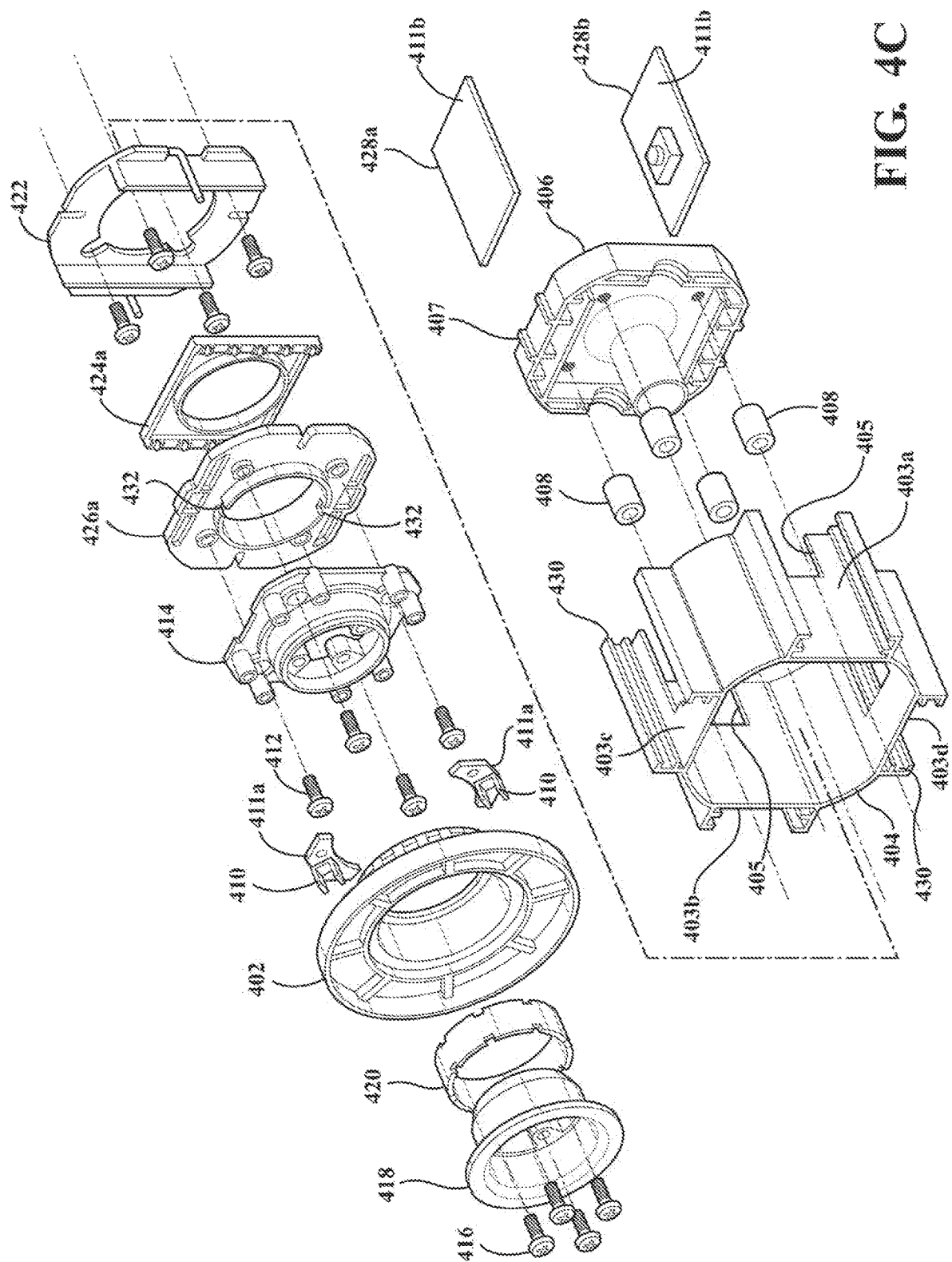
FIG. 4C is an exploded view of the device shown in FIG. 4A.

In FIGS. 4A, 4B and 4C a modular input interface device 400 capable of five directions of movement is shown. The reference numbers presenting elements in FIGS. 4A-4C are represented by similar reference numbers that were presented with respect to FIGS. 3A-3C except that the numbering begins with a four instead of a three. Like elements presented in FIG. 3A-3C are represented in FIG. 4A-4C with this format and will not be repeated here for simplicity. In a perspective view shown in FIG. 4A, the modular input interface device 400 has an outer ring 402 that is rotatably set within a housing 404. The housing 404 remains stationary when the outer ring 402 is rotated. In the configuration of the modular input interface device 400 described with reference to FIGS. 4A-4C the outer ring 402 may also be moved laterally in two directions along a first axis. For example purposes, the two directions along a first axis will be described as left and right lateral movement.

The housing 404 has four faces 403a, 403b (not shown in FIG. 4A), 403c, and 403d. Each face 403a-403d has an opening 405 therein. A base 406 is positioned in an interior of the housing 404 at a bottom portion of the housing 304. Each face 403a-403d of the housing 404 has a slot 430 on an exterior surface of the housing 404.

To sense lateral movement in two directions along a first axis, slots 430 receive a sensor element, shown as a pair of sensors 428a and 428b. 428b is not visible in the view shown in FIG. 4A but is retained in a slot 430 opposite of the slot 430 that receives sensor 428a. The pair of sensors 428a and 428b sense left and right lateral movement of the outer ring 402 through an opening 405 in the slot 430 (this feature is most clearly shown in FIG. 4C). For the modular input interface device 400 having five directions of movement, only two of four slots 430 are utilized.

FIG. 4B is a cut away view of one or more embodiments of the modular input interface device 400 which allows the device to move in five directions, namely 360 degrees of rotational movement in a clockwise direction, 360 degrees of rotational movement in a counterclockwise direction, push vertical movement, lateral left movement and lateral right movement as shown by multiple arrows in FIG. 4B. The outer base 406 is positioned inside the housing 404. The outer ring 402 is rotatably attached to a male inner housing 418 which is disposed in a center of the outer ring 402. A rotary bearing system 420, such as a cage resting circumferentially between the outer ring 402 and the male inner housing 418, allows the male inner housing 418 to cooperate with the female inner base 414 while the outer ring 402 freely rotates about the male inner housing 418. Using fasteners 416, the male inner housing 418 is attached to the female inner base 414.

FIG. 4C is an exploded view of the modular input interface device 400. Sensors 410 detect and sense rotational movement of the outer ring 402 and provide information necessary for a processor to generate and execute instructions that will adjust any relevant vehicle system stings and/or any display settings, Optical sensors are shown in FIG. 4C. However, it should be noted that many other types of sensors may also be used. Further, the detected movement may be sent to a processor and utilized as necessary to maintain a fixed orientation of the content being displayed at the display of the modular input interface device regardless of the rotational, push/pull and lateral movement of the modular input interface device. A printed circuit board having a processor 411a is in communication with the sensors 410 and the main printed circuit board (not shown). Any movement of the outer ring 402 may be detected, as by sensors 410 and communicated to one or more processors (not shown) that are associated with one or more vehicle systems (not shown) so that instructions are communicated to and from any relevant vehicle system. The instructions may also cause the processor to change the content being displayed at the display as a result of the user selections.

For facilitating left and right lateral movement, the modular input interface device 400 has a slide outer frame 422, a first slide cage 424a, and a first slide inner frame 426a. The first slide inner frame 426a interacts with the first slide cage 424a to allow limited spring back movement of the outer ring laterally in left and right directions. The first slide inner frame 426a attaches, via fasteners 412, to a bottom surface of the female inner base 414. A pair of sensors 428a and 428b are retained in the housing 404 at slots 430. The sensors 428a and 428b detect when the outer ring 402 is moved laterally to the left or to the right. The sensors 428a and 428b may be mounted on printed circuit board that also includes a processor 411b. The sensors shown in FIG. 4C may be any form of tactile device, such as a switch mat TACT switch, capacitive touch zone, to name just a few examples.

Spacers 408 offset a mounting distance between an outer base 406 a female inner base 414. Fasteners 412 attach the female inner base 414 to the spacers 408. The spacers 408 rest on the outer base 406. When compared to the spacers 308 presented in FIG. 3C, the spacers 408 in the modular input interface device 400 are shorter because there is less distance between the outer base 406 and female inner base 414 due to parts being added to the modular input interface device 400 to accommodate five degrees of movement.

The modular input interface device 400 shown in FIGS. 4A-4C is configured so that the outer ring 402 is capable of being moved in five directions. The outer ring 402 rotates clockwise, rotates counterclockwise, may be pushed vertically, moves laterally to the left and moves laterally to the right. The first slide inner frame 426a has slots 432 that align with a location of the sensors 428a and 428b in slots 430 of the housing 404. Therefore, when the outer ring 402 is moved laterally in left and right directions, the movement is translated to the first slide cage 424a which is free to slide in a limited space between the slider outer frame 422 and the first slide inner frame 426a. The lateral movement is sensed by the sensors 428a and 428b and a signal is communicated to any relevant processors associated with one or more displays and/or one or more vehicle systems.

When the sensors 410 detect rotational movement and the sensors 428a, 428b detect left-to-right movement, they will provide signal data to one or more processors 411a, 411b that may also be communicated to a main processor and used to determine changes that need to be made to the content being displayed and/or vehicle systems associated with the content being displayed and the user selections determined by the movement of the modular input interface device 400.

Figure 5A:
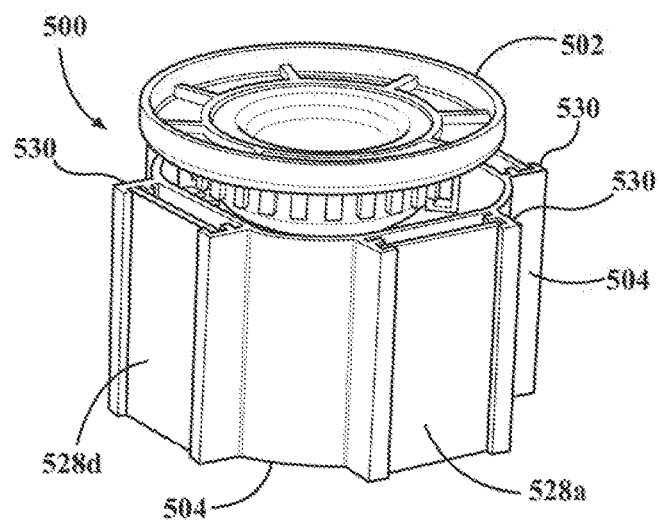
FIG. 5A is a perspective view of the modular input interface device having movement in seven directions.
Figure 5B:
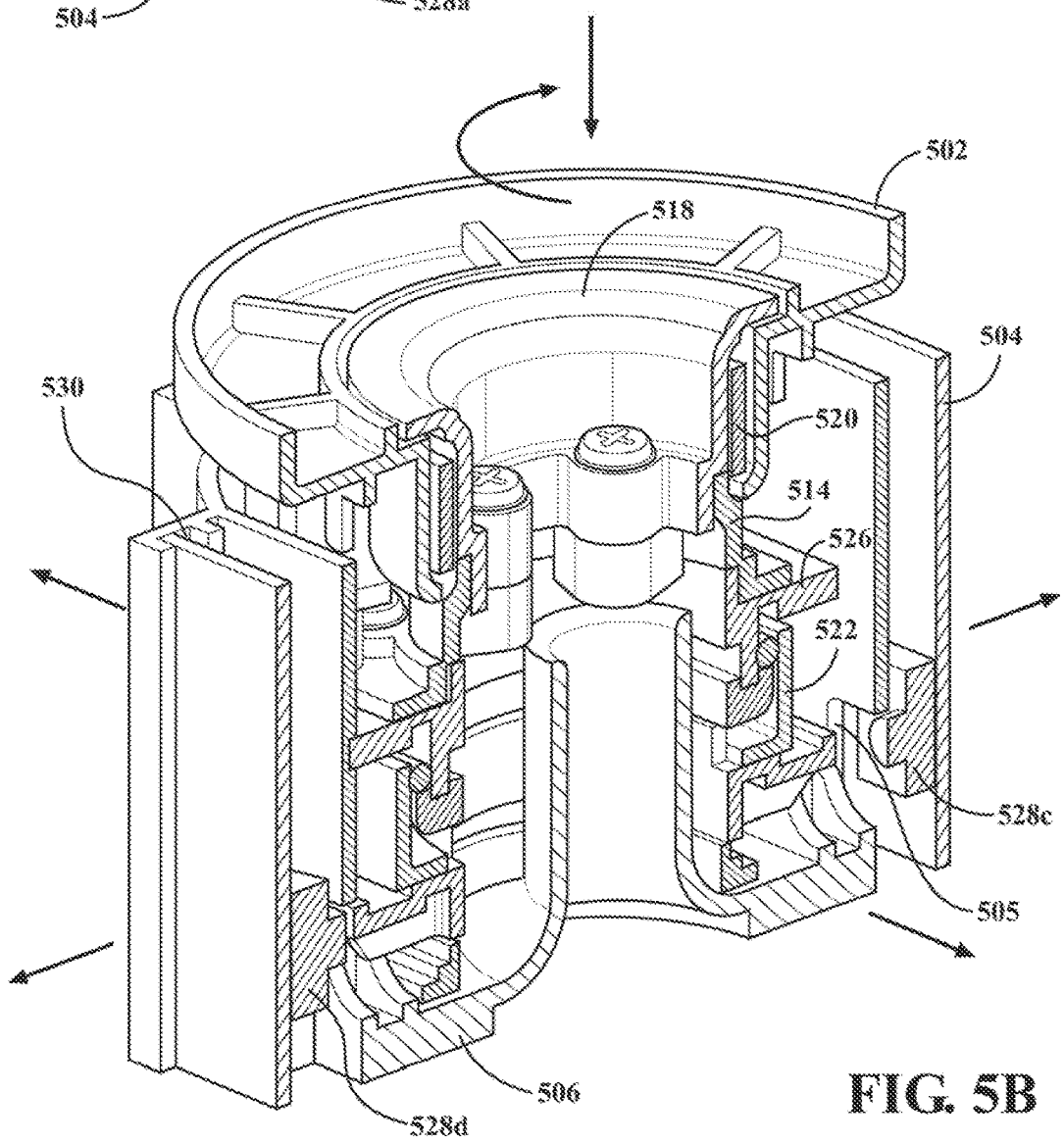
FIG. 5B is a cut-away view of the modular input interface device of FIG. 5A.

In FIGS. 5A, 5B and 5C a modular input interface device 500 having seven directions of movement is shown. The reference numbers presenting elements in FIGS. 5A-5C are represented by similar reference numbers that were presented with respect to FIGS. 4A-4C except that the numbering begins with a four instead of a three. Like elements presented in FIG. 4A-4C are represented in FIG. 5A-5C with this format and will not be repeated here for simplicity. In a perspective view shown in FIG. 5A, the modular input interface device 500 has an outer ring 502 that may receive a display (not shown). Sensors 528a and 528d are shown in slots 530 to detect movement of the outer ring 502 in two directions along a first axis (left, right) and in two directions along a second axis. For example purposes, the two directions along the second axis will be described as front and back directions.

FIG. 5B is a cut away view of one or more embodiments of the modular input interface device 500 which allows the device to move in seven directions, namely 360 degrees of rotational clockwise movement, 360 degrees of rotational counterclockwise movement, push, lateral left, lateral right, lateral front and lateral back movement as shown by the arrows in FIG. 5B.

An outer base 506 is positioned inside the housing 504 and cooperates with a female inner base 514. A male inner housing 518 is fixedly attached to the female inner base 514. An outer ring 502 rotates about the male inner housing 518 by way of a rotary bearing system 520, shown as a cage 520. Rotational movement of the outer ring 502 may detected by sensors 510 and communicated to one or more processors on to cause the processor to change the content being displayed at a display (not shown) or make adjustments to one or more vehicle systems as a result of the user selections made by movement of the outer ring 502 of the modular input interface device 500.

The male inner housing 518 is disposed in a center of the outer ring 502 and the cage 520 rests circumferentially between the outer ring 502 and the male inner housing 518. The cage allows the outer ring 502 to rotate about the male inner housing 518 while the male inner housing 518 cooperates with the female inner base 514. Using fasteners 516, the male inner housing is attached to a female inner base 514. The outer ring 502 rotates about the male inner housing 518 without causing any rotational movement of the male inner housing 518. The sensors 510 detect rotational movement of the outer ring 502 and communicate movement to one or more processors, such as the processor 511a. Optical sensors are shown in FIG. 5C. However, it should be noted that many other types of sensor may also be used.

In operation, the outer ring 502 is rotated by a user. The housing 504, the male inner housing 518, a base 506, sensors 510 and the female inner base 514 remain stationary and do not rotate with the outer ring 502. The sensors 510 detect rotational movement of the outer ring 502. Upon detecting movement, the sensors 510 provide signal data to the processor 511a to indicate any instructions that may alter vehicle systems in response to the movements of the outer ring 502. The processor may determine and communicate changes that may need to be made to the content being displayed at the display (not shown) or to display settings associated with the display.

FIG. 5C is an exploded view of the modular input interface device 500. Spacers, not shown in FIG. 5C, which were incorporated for purposes described previously with reference to FIGS. 3C and 4C are not needed in FIG. 5C due to the additional structure that is added to accommodate seven directions of movement of the outer ring 502. In cooperation with the female inner base 514, the modular input interface device 500 also has a slide outer frame 522, a first slide cage 524a, and first slide inner frame 526a to allow limited movement and spring back movement of the outer ring 502 in left and right directions without affecting the outer ring 502. The first slide inner frame 526a attaches to a bottom surface of the female inner base 514. A pair of sensors 528a and 528b are retained in the housing 504 by slots 530. The sensors 528a and 528b detect when the outer ring 502 moves to the left or to the right. The sensors 528a and 528b are mounted on printed circuit board that also includes a processor 511b.

Any lateral movement of the outer ring 502 in two directions along a first axis, left-to-right direction, is detected by the sensors 528a, 528b. The first slide inner frame 526a has slots 532 that align with a location of the sensors 528a and 528b. Therefore, as the outer ring 502 moves from left to right, the movement is detected by the sensors 528a and 528b. The first slide cage 524a is free to slide about in a space between the slider outer frame 522 and the first slide inner frame 526a.

Lateral movement of the outer ring 502 in two directions along the second axis may be detected by incorporating a second slide cage 534a, and second slide inner frame 536a to allow limited movement and spring back movement of the outer ring 502. An additional pair of sensors 528c and 528d are retained in the housing 504 by slots 530. The sensors 528c and 528d detect when the second slide cage 534a moves to the front or to the back. The sensors 528c and 528d may be mounted on printed circuit board that includes a processor 511c.

Any lateral movement of the outer ring 502 in a left-to-right direction is translated to the slide cage 524a, and detected by the sensors 528a, 528b. Any lateral movement of the outer ring 502 in a front-to-back direction is translated to the slide cage 534a and detected by sensors 528c and 528d. The modular input interface device 500 allows the outer ring 502 to move in seven directions, rotate clockwise, rotate counterclockwise, push/pull, lateral left, lateral right, lateral front, and lateral back.

When the sensors 510 detect rotational movement, the sensors 528a, 528b detect left-to-right movement, and the sensors 528c, 528d detect front-to-back movement they provide signal data to the processor 511a, 511b that is communicated to one or more processors (not shown) and used to determine changes that need to be made to the content being displayed and/or settings for one or more vehicle systems associated with the content being displayed and the user selections determined by the movement of the modular input interface device 500.

When the sensors 510 detect rotational movement, the sensors 528a, 528b detect left-to-right movement, and the sensors 528c, 528d detect front-to-back movement they also provide signal data to the processors 511a, 511b representative of the user's selections. The user input is communicated to the main printed circuit board (not shown) and used to determine changes that need to be made to the content being displayed and/or vehicle systems associated with the content being displayed based on the movement of the modular input interface device.

When the display forms a part of the modular input interface device, and the movement of the modular input interface device translates off-axis, the display itself also moves with the modular input interface device. Therefore, it becomes necessary to address an orientation of the content being displayed and maintaining a fixed orientation of the content being displayed, regardless of any off-axis movement of the modular input interface device. This is accomplished by implementing an modular input interface device that moves freely in three, five or seven directions while sensing the movement and generating instructions that maintain a default orientation for the content being displayed on the display of the modular input interface device.

In one or more embodiments, any one of the processors may determine display settings that must be made in order to adjust the content being displayed on the display so that it stays in a default orientation even while the user interface input device, including the display, is pushed, pulled, rotated around and translated off axis from left-right and front-back. In one or more embodiments, movement of the user interface input device may be unrestricted, and a processor adjusts the content on the display to remain in a default orientation with respect to the axis, yet the user interface input device is rotating about the axis and may be moving off-axis. The movements of the user interface device may be detected and measured by any one or more of the sensors. Sensors that detect movement of the device provide input to the processor that has the capability adjust settings at the display to maintain the content being displayed in a default orientation.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A modular input interface device, comprising:
   a housing configured to accommodate a plurality of sensor elements, at least one sensor element in the plurality of sensor elements is positioned inside the housing, the housing has a plurality of faces, each face in the plurality of faces has an opening to the interior of the housing;
   a plurality of slots, each slot is on an exterior of each face in the plurality of faces;
   an outer ring attached to the housing in a manner that allows the outer ring to rotate, move up and down, move laterally in two directions along a first axis, and move laterally in two directions along a second axis, the first axis being perpendicular to the second axis;
   the at least one sensor element in the plurality of sensor elements senses clockwise and counterclockwise rotational movement of the outer ring and provides a signal representative of the rotational movement of the outer ring.

2. The device according to claim 1, further comprising at least a second sensor element in the plurality of sensor elements, the at least a second sensor element is positioned in one or more of the slots and is exposed to the interior of the housing through the opening in a respective face in the plurality of faces, the second sensor element senses lateral movement of the outer ring along the first axis and provides a signal representative of the lateral movement of the outer ring along the first axis.

3. The device according to claim 2, further comprising a first cage positioned in the housing and in cooperation with the outer ring, any lateral movement of the outer ring along the first axis causes the first cage to move within the housing and movement of the first cage is sensed by the at least a second sensor element as movement of the outer ring.

4. The device according to claim 3, further comprising at least a third sensor element in the plurality of sensor elements, the at least a third sensor element is positioned in at least one of the slots and is exposed to the interior of the housing through the opening in the face, the at least a third sensor element is positioned adjacent to the second sensor element, the at least a third sensor element senses lateral movement of the outer ring along the second axis.

5. The device according to claim 4, further comprising a second cage positioned in the housing and in cooperation with the outer ring, any lateral movement of the outer ring along the second axis causes the second cage to move within the housing and movement of the second cage is sensed by the at least a third sensor element as movement of the outer ring.

6. The device according to claim 1, wherein the housing further comprises a base configured to receive a sensor element of the plurality of sensor elements, the sensor element is positioned in the base for detecting downward movement of the outer ring.

7. A modular input interface device comprising:
a housing having a left face, a right face, a front face and a rear face, each face having an opening to an interior of the housing;
a slot on an exterior surface of the housing at each of the left, right, front and rear faces of the housing;
a base portion positioned inside the housing at a bottom portion of the housing;
an inner base within the housing, the inner base cooperates with the base portion and remains stationary relative to the housing;
an outer ring at a top portion of the housing, the outer ring cooperates with and rotates above the inner base; and
a first pair of sensors on the inner base that detect rotational movement of the inner base.

8. The device according to claim 7, further comprising:
a male inner housing positioned through a center of the outer ring, the male inner housing is attached to the inner base;
a rotary bearing circumferentially disposed between the outer ring and the male inner housing.

9. The device according to claim 7, wherein the first pair of sensors is communicatively coupled to at least one processor.

10. The device according to claim 7, further comprising:
a first slide cage within the housing, the first slide cage is positioned between the base portion and the inner base, the first slide cage has a first slide inner frame, the first slide inner frame has slots in first and second lateral directions to allow movement of the outer ring in the first and second lateral directions to be translated to and limit movement of the first slide cage to a predetermined distance in each of the first and second lateral directions; and
a second pair of sensors to detect movement of the first slide cage in the first and second lateral directions, the second pair of sensors are positioned in the slots on the left and right faces of the housing.

11. The device according to claim 10, wherein the first and second pair of sensors are communicatively coupled to at least one processor.

12. The device according to claim 10, further comprising:
a second slide cage within the housing between the first slide cage and the base portion, the second slide cage has a second slide inner frame, the second slide inner frame has slots positioned in third and fourth lateral directions to allow movement of the outer ring in the third and fourth lateral directions to be translated to and limit movement of the second slide cage to a predetermined distance in the third and fourth lateral directions; and
a third pair of sensors to detect movement of the second slide cage in the third and fourth lateral directions, the third pair of sensors are positioned in the slots on the front and rear faces of the housing.

13. The device according to claim 12, wherein the first, second and third pair of sensors communicatively coupled to at least one processor.

14. A modular input interface device, the device comprising:
a housing having a left face, a right face, a front face and a rear face, each face having an opening to an interior of the housing;
a slot on an exterior surface of the housing at each of the left, right, front and rear faces of the housing;
an outer ring at the top of the housing, the outer ring rotates above the housing and moves vertically within the housing;
a base portion positioned inside the housing at a bottom portion of the housing;
a female inner base that cooperates with the base portion and remains stationary relative to the housing;
a male inner housing passing through a center of the outer ring, the male inner housing is attached to the inner base;
a rotary bearing circumferentially disposed between the outer ring and the male inner housing;
a first pair of sensors on the female inner base that cooperate with and detect rotational movement of the outer ring;
a first slide cage in the housing positioned between the base portion and the female inner base, the first slide cage has a first slide inner frame, the first slide inner frame has slots at first and second lateral directions to allow movement of the outer ring in the first and second lateral directions to be translated to movement of the first slide cage, the slots in the first slide cage limit movement of the first slide cage to a predetermined distance;
a second pair of sensors positioned in the slots on the left and right faces of the housing, the second pair of sensors detect movement of the first slide cage in the first and second lateral directions;
a second slide cage in the housing positioned between the first slide cage and the base portion, the second slide cage has a second slide inner frame, the second slide inner frame has slots positioned in third and fourth lateral directions to allow movement of the outer ring in the third and fourth lateral directions to be translated to movement of the second slide cage, the slots in the second slide cage limit movement of the second slide cage to a predetermined distance; and
a third pair of sensors positioned in the slots on the front and rear faces of the housing, the third pair of sensors detect movement of the second slide cage in the third and fourth lateral directions;
wherein the device is configured for up to seven directions of movement.

15. The device according to claim 14 wherein the first, second and third pair of sensors are communicatively coupled to at least one processor.

* * * * *